United States Patent
Reif (10) Patent No.: US 11,184,574 B2
(45) Date of Patent: Nov. 23, 2021

(54) REPRESENTING REAL-WORLD OBJECTS WITH A VIRTUAL REALITY ENVIRONMENT

(71) Applicant: Facebook, Inc., Menlo Park, CA (US)

(72) Inventor: Daniel Jacob Reif, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/651,932

(22) Filed: Jul. 17, 2017

(65) Prior Publication Data

US 2019/0020843 A1 Jan. 17, 2019

(51) Int. Cl.
| | |
|---|---|
| *H04N 5/45* | (2011.01) |
| *G06T 3/00* | (2006.01) |
| *H04N 5/445* | (2011.01) |
| *G06F 3/00* | (2006.01) |
| *G06T 19/00* | (2011.01) |
| *G02B 27/01* | (2006.01) |

(52) U.S. Cl.
CPC ......... *H04N 5/44504* (2013.01); *G02B 27/01* (2013.01); *G02B 27/017* (2013.01); *G06F 3/005* (2013.01); *G06T 19/006* (2013.01); *G02B 2027/014* (2013.01); *G02B 2027/0138* (2013.01)

(58) Field of Classification Search
CPC .................. G06T 19/006; G06T 19/20; G06T 2207/10028; G06T 15/04; G06T 17/00; G06T 17/20; G06T 7/60
See application file for complete search history.

(56) References Cited

U.S. PATENT DOCUMENTS

| | | | | |
|---|---|---|---|---|
| 6,792,147 B1 * | 9/2004 | Saka | ................... | G06K 9/3241 382/190 |
| 10,176,636 B1 * | 1/2019 | Neustein | ............... | G06T 19/006 |
| 2012/0113140 A1 * | 5/2012 | Hilliges | .................. | G06F 3/011 345/633 |
| 2016/0093108 A1 * | 3/2016 | Mao | ........................ | A63F 13/42 345/633 |
| 2018/0095542 A1 * | 4/2018 | Mallinson | ............... | G06F 1/163 |
| 2018/0108179 A1 * | 4/2018 | Tomlin | ............... | G02B 27/0172 |

* cited by examiner

*Primary Examiner* — Tapas Mazumder
(74) *Attorney, Agent, or Firm* — Fenwick & West LLP (57) ABSTRACT

An image processing system enables a user wearing a head-mounted display to experience a virtual environment combined with a representation of a real-world object. The image processing system receives a captured scene of a real-world environment that includes a target object. The image processing system identifies the target object in the captured scene and generates a representation of the target object. In some cases, the image processing system may include a graphical overlay with the representation of the target objet. The image processing system can generate a combined scene that includes the target object and the virtual environment. The combined scene is presented to the user, thereby allowing the user to interact with the real-world target object (or a representation thereof) in combination with the virtual environment.

9 Claims, 6 Drawing Sheets

System environment
100

Combined scene

Captured scene
including
target object

REPRESENTING REAL-WORLD OBJECTS WITH A VIRTUAL REALITY ENVIRONMENT

BACKGROUND

This disclosure relates generally to an image processing system, and more specifically to rendering content via a virtual reality (VR) system.

VR technology and corresponding equipment such as head-mounted displays (HMDs) or VR headsets are becoming increasingly popular. A virtual scene rendered to a user wearing an HMD can provide an interactive experience in a virtual environment. At times, the user may intend to interact with objects, such as real-world objects, while wearing the HMD. However, in some conventional VR systems, while the user is wearing the HMD, he/she may be unable to see and/or may have difficulty determining where a real-world object is. As such, conventional approaches can make it inconvenient or challenging for the user wearing the HMD to interact with the real-world object while experiencing the virtual environment. This can degrade the user experience associated with utilizing, engaging with, or otherwise interacting with the virtual environment.

SUMMARY

An image processing system can provide a virtual reality (VR) experience to a user wearing a head-mounted display (HMD) and can enable the user to interact with one or more objects in a real-world environment. In one example, the image processing system receives image data (e.g., one or more still frame images and/or video frame images, etc.) of a scene. In some cases, receiving data can include capturing, detecting, acquiring, and/or obtaining data. The scene can be associated with a real-world environment around the user wearing the HMD. The real-world environment can include a real-world object that is captured in the scene. In other words, received image data representing the scene can include image data that represents the real-world object. The real-world object in the captured scene (i.e., in the received image data of the scene) is referred to as a target object. In this example, the user wearing the HMD and experiencing a virtual environment may desire or intend to interact with the target object while continuing to experience the virtual environment while wearing the HMD. The image processing system can detect or identify the target object in the captured scene. After identifying the target object in the captured image, the image processing system can include the target object within the virtual environment that the user is experiencing via the HMD. A generated scene including the virtual environment and a rendering (i.e., a rendered/generated representation) of the target object is referred to as a combined scene. The image processing system can present the combined scene to the user via the HMD.

In some embodiments, the image processing system creates the appearance that the target object (e.g., received pixel data representing the target object) "passes through" into the virtual environment provided to the user via the HMD. A user holding a target object, for example, may have the target object represented in the virtual world shown in the HMD at the location of the physical object in the real world. For instance, pixel data received for the target object (e.g., real-world object) can be used to generate pixel data for a representation of the target object rendered in combination with the virtual environment. The pixel data for the representation of the target object can be rendered in a combined scene with the virtual environment. In some cases, the pixel data received for the target object can be modified in order to generate the pixel data for the representation of the target object rendered in combination with the virtual environment. In some cases, the pixel data for the representation of the target object can be generated to be equivalent to the pixel data initially received for the target object.

Moreover, in some implementations, the image processing system can cause the target object to appear to be overlaid on the virtual environment experienced by the user wearing the HMD. In some implementations, while rendering the target object with the virtual environment, the image processing system can apply a graphical overlay, such as a skin, to the target object. The graphical overlay can, as used herein, refer to a visual effect that the image processing system applies in association with rendering a representation of the real-world object. In some cases, the graphical overlay (e.g., skin) can be applied in attempt to assist the user to track the target object in the virtual environment, and/or to allow the target object to more appropriately fit the virtual environment in a graphical sense (e.g., to visually fit a theme of the virtual environment).

The figures depict various embodiments of the disclosed technology for purposes of illustration only. One skilled in the art will readily recognize from the following discussion that alternative embodiments of the structures and methods illustrated herein may be employed without departing from the principles of the technology described herein.

DETAILED DESCRIPTION

System Architecture

Figure 1:
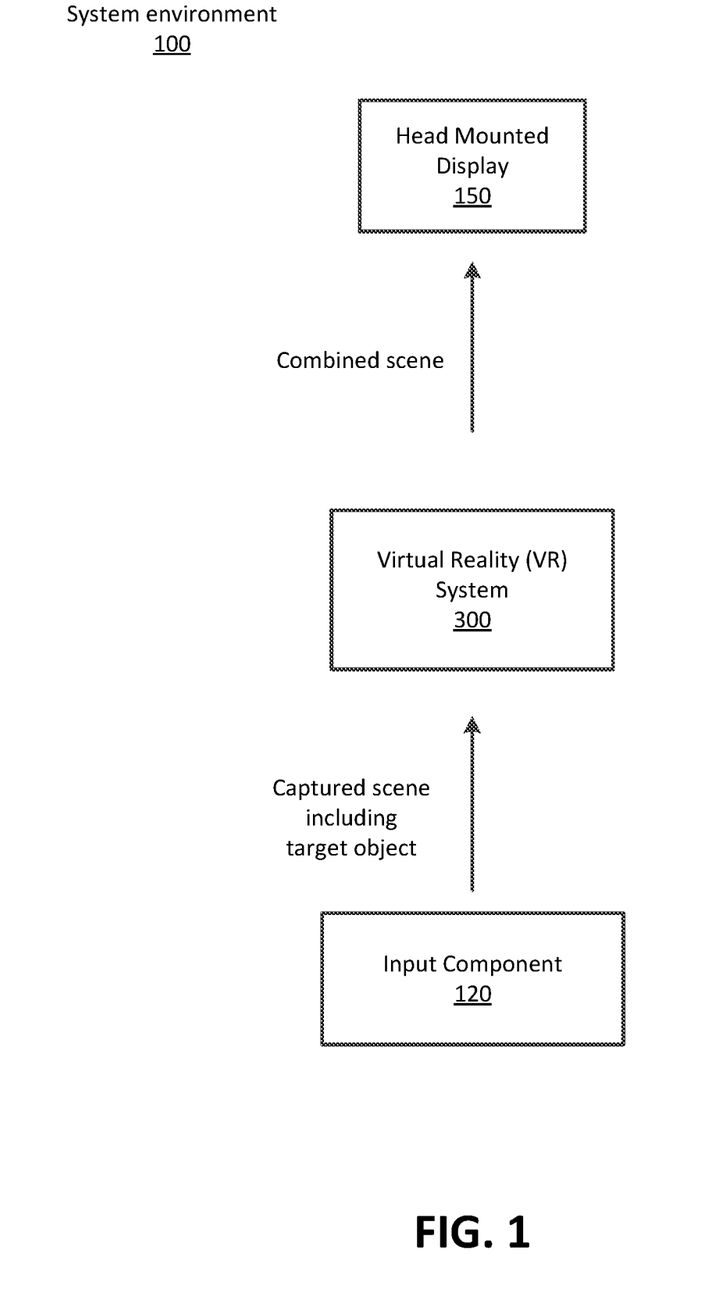
FIG. 1 illustrates a block diagram of an example system environment in which an image processing system can operate, in accordance with an embodiment.

FIG. 1 shows a block diagram of a system environment 100 in which an image processing system, such as a virtual reality (VR) system 300, operates, in accordance with an embodiment. The system environment 100 shown in FIG. 1 includes an input component 120, (e.g., an image capture device, a camera, etc.), a VR system 300, and a head-mounted display (HMD) 150. Only one input component, one VR system, and one HMD are shown in FIG. 1 for purposes of illustration. In alternative embodiments not explicitly shown, the system environment 100 can include multiple input components 120, VR systems 300, HMDs 150, and different and/or additional components. Likewise, the functions performed by various entities, modules, components, and/or devices, etc., in the system environment 100 may differ in different embodiments.

As discussed more fully below, in this environment, the HMD 150 provides content for a user operating in an environment (e.g., real-world environment) or local area. The user wearing the HMD 150 may interact with objects in the environment that are identified by the VR system and represented in the display shown to the user. The input component 120 receives, such as by detecting, acquiring, and/or capturing, a view of the environment that can include various real-world objects. The VR system 300 analyzes the view of the environment to identify one or more target objects to be presented to the user via the HMD 150. For example, a target object may be a real world object with a recognizable size, shape, color, or other characteristics identifiable by the VR system 300. A representation of these target objects is generated by the VR system 300 and combined with the other content (such as rendered VR content) to generate a combined scene for viewing in the HMD 150.

The input component 120 can be configured to capture image data (e.g., one or more still frames, one or more video image frames, etc.) of a real-world scene in a local area. The local area can be an environment in reality (e.g., in the real world) where a user wearing the HMD 150 is located. For example, the user wearing the HMD 150 may stand or sit in an environment and may face a particular real-world scene in the local area. In one embodiment, the input component 120 is an outward facing camera installed on the HMD 150. For instance, the camera can be facing, within an allowable deviation, a direction in which the user wearing the HMD 150 is facing. In some implementations, the input component 120 thus captures image data representing the real-world scene that the user wearing the HMD 150 would see if he/she was not wearing the HMD 150. For example, the real-world scene can depict one or more real-world objects and the input component 120 captures image data representing the one or more real-world objects. In this example, at least some of the one or more real-world objects can correspond to a target object. The input component 120 provides the information that it detects, captures, acquires, and/or receives (e.g., image data representing at least one target object) to the VR system 300.

In some embodiments, the HMD 150 can be included as a part of the VR system 300. In some embodiments, the HMD 150 can be separate from, but utilized by and/or operable with, the VR system 300. In one example, the HMD 150 can correspond to a VR headset that enables the user wearing it to experience a virtual environment. For instance, the HMD 150 can display one or more virtual scenes or views of the virtual environment, such that the user feels as if he/she were actually present in the virtual environment through the scenes or views displayed on the HMD 150. Additionally, in some implementations, the HMD 150 can include the input component 120 (e.g., a camera facing the same direction as the user) configured to capture a view(s) or scene(s) of a real-world environment that the user would perceive if he/she was not wearing the HMD 150. In some cases, the input component 120 can be separate from the HMD 150.

In some embodiments, the VR system 300 presents one or more representations of one or more target objects combined together with a virtual environment to a user wearing the HMD 150. For instance, the VR system 300 sends the representations of the target objects combined with the virtual environment for presentation at the HMD 150. The VR system 300 receives image data representing a real-world environment. The VR system 300 identifies one or more portions of the image data corresponding to one or more target objects included in the real-world environment. For example, the VR system 300 can identify the one or more portions by tracking the one or more target objects from one received image frame to another. In some cases, the VR system 300 can include a default setting, a predefined configuration, and/or programmed logic, etc., to identify certain real-world objects as target objects. For instance, utilizing object recognition technology (e.g., based on machine learning, edge detection, line detection, and/or computer vision, etc.), the VR system 300 can identify one or more portions of received image data that represent one or more specified target objects. In one example, a target object may be a specific object, or may be an object with one or more specific properties, that the object recognition technology has already been set, configured, or programmed to attempt to recognize in the received image data.

Moreover, in some cases, the VR system 300 can utilize at least one of a marker, a tag, a coloring, or a painting that is physically associated with a target object in order to identify the target object (or image data portions representing the target object). For example, one or more target objects can be physically marked with one or more tags (e.g., one or more colored dots/stickers). The VR system 300 can be configured and/or trained to detect, identify, and/or recognize the one or more tags based on analysis of image data received via the input component 120. Based on detecting the one or more tags, the VR system 300 can identify the one or more target objects that are marked with the one or more tags. In another example, a target object can be fitted with a marker that transmits a signal, such as an infrared (IR) emitter that emits an infrared signal. In this example, the VR system 300 can utilize an input component 120 corresponding to an IR detector or sensor to identify the emitted IR signal and thus to facilitate identifying the target object.

Furthermore, the VR system 300 can generate, based on the identified one or more portions of the image data, one or more representations of the one or more target objects. In some implementations, the VR system 300 can "pass through" the received image data representing a target object into a rendered scene to combine the real-world target object and a virtual environment. For example, the identified one or more portions of the image data can be associated with or can correspond to a first set of pixels (i.e., data about a first set of pixels). In this example, one or more representations of one or more target objects can be associated with or can correspond to a second set of pixels (i.e., data about a second set of pixels). The VR system 300 can generate the second set of pixels based on the first set of pixels received via the input component 120. Pixel locations of the first set of pixels can be translated to pixel locations for the second set of pixels. Continuing with this example, the VR system 300 can cause the first set of pixels to pass through as the second set of pixels, such that the second set of pixels is generated to be equivalent to the first set of pixels. In some instances, the one or more representations of the one or more target objects can be generated without modifying (e.g., without additional image processing techniques being applied to) the one or more portions of the image data.

Figure 2A:
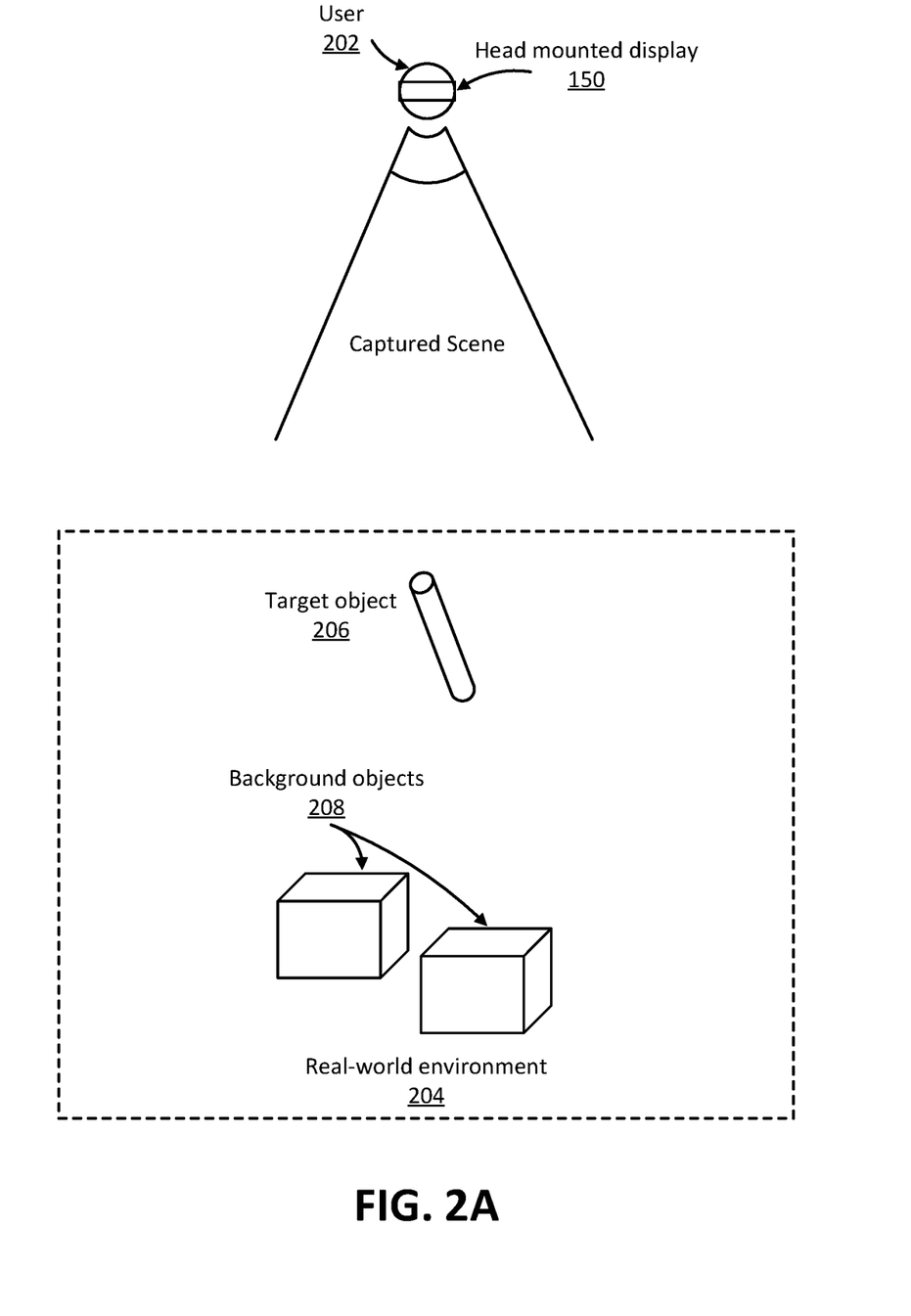
FIG. 2A illustrates an example environment in which an image processing system operates, in accordance with an embodiment.

FIG. 2A illustrates an example environment in which an image processing system, such as a VR system 300, operates, in accordance with an embodiment. As shown in FIG. 2A, there can be a user 202 of the image processing system and a real-world environment 204. In this example, the user 202 can be wearing a head-mounted display (HMD) 150 associated with the image processing or VR system 300. Although not explicitly shown, in some implementations, the HMD 150 can include an input component 120. The input component 120 can, for instance, be outward facing or substantially facing a direction in which the user 202 is facing. The input component 120 captures image data representing the real-world environment 204. In the example of FIG. 2A, the real-world environment 204 can include one or more real-world objects, such as one or more target objects 206. In this example, the one or more real-world objects can also include one or more background objects 208.

In some embodiments, the input component 120, which can be associated with the VR system 300 and/or installed at the HMD 150, receives image data corresponding to or representing a real-world scene (e.g., a portion, view, and/or perspective, etc., of the real-world environment 204). The VR system 300 can analyze the received image data to identify one or more target objects 206 represented in the received image date (i.e., in one or more portions of the received image data). For example, object detection technology and/or object recognition technology can be utilized by the VR system 300 to facilitate identifying one or more portions of the received image data that represent or depict the one or more target objects 206. In this example, object detection technology and/or object recognition technology can be utilized by the VR system 300 to distinguish a target object 206 from a background object 208 or from another non-target object. As discussed above, in some cases, the target object 206 can be defined based on preprogrammed logic, a predefined setting, and/or a default configuration, etc. In the example of FIG. 2A, the VR system 300 can be configured to identify a stick as a target object 206. In other words, the target object 206 can be specifically defined to be a stick. As such, in this example, the received image data can be analyzed to identify one or more portions of the image data that represent the stick target object 206. The VR system 300 can distinguish between the stick target object 206 and the background objects 208. For instance, there may be multiple target objects in the real-world environment 204 to be detected and/or identified by the VR system 300. The VR system may be configured to identify target object(s) 206 having various different shapes or types and there may be more than one background object 208 identified in the captured scene.

Figure 2B:
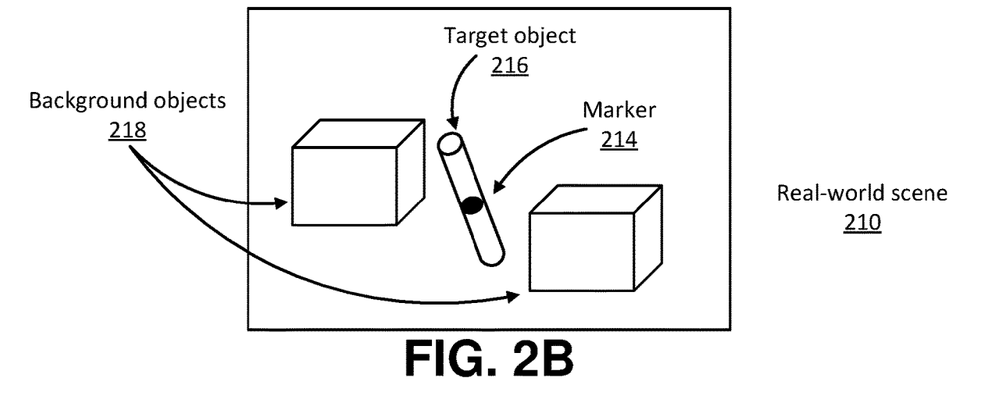
FIG. 2B illustrates an example real-world scene including one or more real-world objects in a real-world environment, in accordance with an embodiment.

FIG. 2B illustrates an example real-world scene 210 including one or more real-world objects in a real-world environment, in accordance with an embodiment. In the example real-world scene 210, there can be one or more real-world objects, such as a target object 216 and background objects 218. In this example, the target object 216 includes a marker 214. Accordingly, a VR system 300 can identify one or more portions of received image data that represent the target object 216 based on the marker 214. As an example, the target object 216 has an infrared (IR) emitter as the marker of the target object 216. In this example, the VR system 300 can utilize an input component 120 that is configured to detect, capture, acquire and/or otherwise receive IR image data, such as an IR signal emitted by the IR emitter marker 214 of the target object 216. For instance, at least a portion of the input component 120 can include an IR sensor, detector, and/or camera, etc. The received IR signal emitted from the IR emitter 214 is used to identify the target object 216 and distinguish the target object 216 from the background objects 218 and other non-target objects.

Figure 2C:
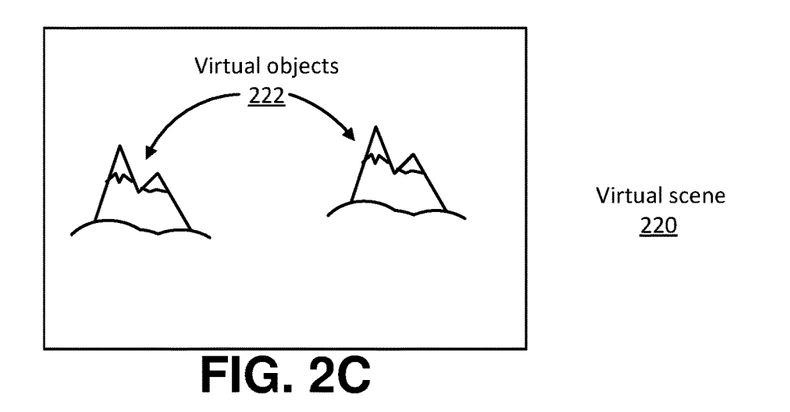
FIG. 2C illustrates an example virtual scene including one or more virtual objects in a virtual environment, in accordance with an embodiment.

FIG. 2C illustrates an example virtual scene 220 including one or more virtual objects in a virtual environment, in accordance with an embodiment. In FIG. 2C, a VR system 300 can provide a virtual environment for a user wearing a HMD 150 to experience. The example virtual scene 220 can be a portion, view, and/or perspective, etc., of the virtual environment that is displayed to the user via the HMD 150. As shown in FIG. 2C, the example virtual scene 220 can include one or more virtual objects 222. In this example, the virtual objects 222 can correspond to virtual hills or mountains within the virtual environment provided by the VR system 300.

Figure 2D:
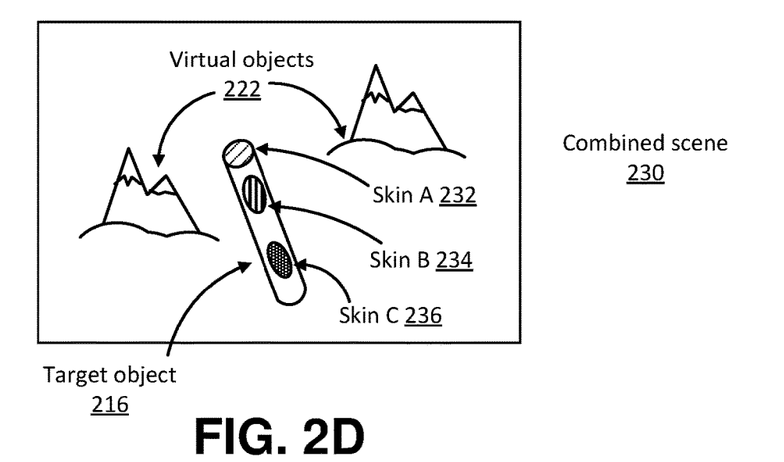
FIG. 2D illustrates an example combined scene including one or more real-world objects and a virtual environment, in accordance with an embodiment.

FIG. 2D illustrates an example combined scene 230 including one or more real-world objects and a virtual environment, in accordance with an embodiment. In the example of FIG. 2D, the VR system 300 can generate a representation of the stick target object 216 based on a portion(s) of received image data identified as representing or depicting the stick target object 216. The representation of the stick target object 216 can be combined with the virtual environment, including the virtual scene 220 with the virtual objects 222, to produce the combined scene 230.

As discussed previously, the representation of the stick target object 216 can be generated based on the identified portion(s) of the received image data that represents, depicts, and/or corresponds to the stick target object 216 in the real-world environment. In some instances, pixels that form the identified portion(s) of the received image data can be passed through into the virtual scene 220 including the virtual objects 222, in order to generate pixels forming the representation of the stick target object 216. In some cases, the representation of the stick target object 216 can be generated based on the identified portion(s) in that the representation can be rendered in the combined scene 230 based on the location(s) of the identified portion(s). For example, the location(s) of the identified portion(s) can be determined and/or tracked in or near real-time, and the representation of the target object 216 can correspond to a rendered skin(s) and/or a graphical icon(s) overlaid in the virtual scene 220 at the location(s) of the identified portion(s).

In the example of FIG. 2D, the combined scene 230 includes the representation of the target object 216 being rendered with one or more graphical overlays (e.g., skins, stickers, animations, graphical filters, etc.). As such, the representation of the target object 216 can include the one or more graphical overlays. In this example, the one or more graphical overlays can partially replace the original appearance of the target object 216. As shown in FIG. 2D, there can be three example skins, such as Skin A 232, Skin B 234, and Skin C 236. Each of these skins can be overlaid on a respective portion of the target object 216. Skin A 232 can be overlaid onto a top portion of the stick target object 216. Skin B 234 can be overlaid onto an upper portion of the body of the stick target object 216. Skin C 236 can be overlaid onto a bottom portion of the body of the stick target object 216. In some cases, the one or more graphical overlays can entirely replace or cover the original appearance of the target object 216. In one example, the representation of the stick target object 216 can include a baseball bat skin, a sword skin, or a joystick overlay, etc. In another example, graphical overlays can have various types, shapes, sizes, and/or colors, etc.

Furthermore, in some cases, a target object can be associated with at least one of a marker, a tag, a coloring, or a painting, as discussed above. In one instance, the marker associated with a target object can emit a wireless signal, such as an IR signal. As discussed, the disclosed technology can cause a representation of the target object to be generated with a graphical overlay, such as a skin. In this instance, the disclosed technology can cause the graphical overlay to be selected based on the wireless signal. A different wireless signal can cause a different graphical overlay to be selected for the representation of the target object.

Figure 3:
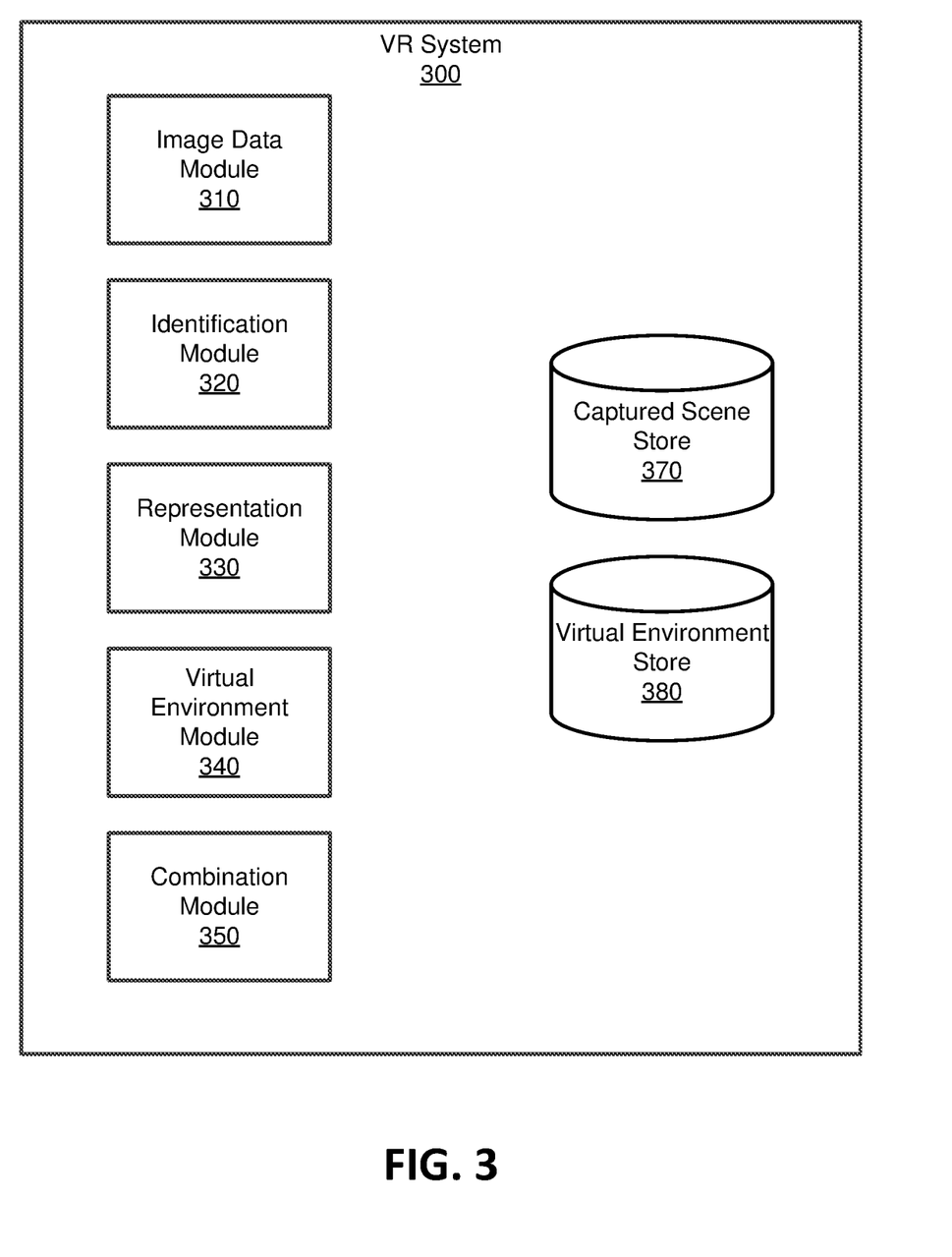
FIG. 3 illustrates a block diagram of an architecture of an example image processing system, in accordance with an embodiment.

FIG. 3 illustrates a block diagram of an architecture of an example image processing system, such as the VR system 300 of FIG. 1, in accordance with an embodiment. As shown in the example architecture of FIG. 3, the VR system 300 can include an image data module 310, an identification module 320, a representation module 330, a virtual environment module 340, a combination module 350, a captured scene store 370, and a virtual environment store 380. FIG. 3 shows one example, and in alternative embodiments not shown, additional, and/or different modules or data stores can be included in the VR system 300. For instance, in some implementations, the VR system 300 also includes a head-mounted display (HMD) 150 and may also include an input component 120. As described above, in some embodiments, the HMD 150 can include an input component 120, such as an outward facing camera installed at the HMD 150.

The image data module 310 communicates with the input component 120 to receive image data captured or received by the input component 120. In some cases, the image data module 310 transmits the received image data to the identification module 320 for identification of target objects within a real-world environment.

The identification module 320 identifies one or more portions of the image data that represent one or more target objects included in the real-world environment. The one or more portions of the image data can, for instance, be associated with a first set of pixels (i.e., data about a first set of pixels). In some embodiments, the identification module 320 can analyze the received image data using object recognition and/or detection techniques to identify the one or more portions of the image data (e.g., the first set of pixels) that represent or depict the one or more target objects. In one example, machine learning can be utilized to train a classifier or model for recognizing one or more particular objects, such as a baseball. In this example, the identification module 320 can include logic, such as a setting, a preference, a configuration, a specification, and/or a manually inputted command, that instructs the identification module 320 to identify baseballs as being target objects. Continuing with this example, when the received image data of the real-world environment contains a baseball, the identification module 320 identifies the specific portion(s) of the received image corresponding to the baseball.

In some embodiments, the identification module 320 identifies a portion(s) of the image data that represents a target object based on at least one of a marker, a tag, a coloring, or a painting associated with the target object. In one example, the target object can have an IR emitter attached to it. The identification module 320 utilizes an IR sensor, detector, and/or receiver, etc., to identify the target object. In another example, a physical sticker having a particular color can be affixed to the target object. In this example, the identification module 320 can include logic that causes the target object to be identified based on recognizing or detecting the physical sticker of the particular color.

Additionally, the representation module 330 can be configured to facilitate generating, based on the one or more portions of the image data, one or more representations of the one or more target objects. As discussed above, the one or more portions of the image data identified by the identification module 320 can be associated with a first set of pixels (i.e., data about a first set of pixels, or first pixel data). For instance, the first set of pixels can form the one or more portions of the image data. In some embodiments, the one or more representations of the one or more target objects can be associated with a second set of pixels (i.e., data about a second set of pixels, or second pixel data). For example, the representation module 330 can cause the second set of pixels to form the one or more representations of the one or more target objects.

In some implementations, the representation module 330 can generate the second set of pixels associated with the one or more representation based on the first set of pixels associated with the one or more portions of the image data. For example, the second set of pixels can be generated by the representation module 330 to be equivalent to the first set of pixels associated with the one or more portions of the image data. In some cases, the one or more representations of the one or more target objects can be generated without modifying the one or more portions of the image data. As such, additional image processing need not be applied to the one or more portions of the image data in order to generate the one or more representations. For instance, the representation module 330 can "pass through" the first set of pixels as the second set of pixels.

Additionally or alternatively, in some embodiments, the representation module 330 can generate the one or more representations of the one or more target objects by graphically modifying the one or more portions of the image data. For instance, the representation module 330 can modify the colors of the one or more portions of the image data to produce the one or more representations. In another instance, the representation module 330 can modify the sizes and/or orientations of the one or more portions of the image data to produce the one or more representations.

In addition, the virtual environment module 340 can be configured to facilitate generating a virtual environment. The virtual environment can be experienced by a user via one or more virtual scenes, which can include one or more virtual objects. The virtual environment module 340 can cause the virtual environment, including the virtual scenes, to be presented or displayed to the user via a HMD 150 worn by the user.

Furthermore, the combination module 350 can be configured to facilitate rendering, displaying, providing, generating, and/or otherwise presenting a scene that combines the virtual environment and the one or more representations of the one or more target objects. For instance, the combination module 350 can generate a combined scene in which a representation of a target object is displayed to the user along with a virtual environment. Accordingly, in this instance, the user can experience the virtual environment while simultaneously interacting with the target object (or a representation thereof).

Moreover, in some implementations, the identification module 320 of the VR system 300 can identify one or more locations of the one or more portions relative to the received image data (e.g., relative to a received image frame). The representation module 330 can then generate the one or more representations of the one or more target objects by rendering the one or more representations based on the one or more locations. For example, the identification module 320 can identify pixel coordinates where one or more target objects are located within an image frame captured or received by the input component 120. The virtual environment module 340 can determine one or more corresponding locations, relative to a virtual environment, that correspond to the one or more locations of the one or more portions relative to the received image data. In this example, the virtual environment module 340 can determine pixel coordinates within the virtual environment that correspond to the identified pixel coordinates relative to the received image frame. The representation module 330 can then cause one or more representations of the one or more target objects to be rendered at the one or more corresponding locations relative to the virtual environment (e.g., at the corresponding pixel coordinates within the virtual environment). The combination module 350 can produce a combined scene in which there is a combination of the one or more representations rendered at the one or more corresponding locations and virtual content rendered at all other locations relative to the virtual environment.

In one example, there can be two target objects, such as a stick and a baseball. A user can be holding the stick and the baseball can be thrown toward the user. In this example, the user can be wearing an HMD 150, which can display to the user a virtual environment, such as a rendered environment representing a famous baseball stadium. The disclosed technology can enable the user to see, via the HMD 150, the stick (or a representation thereof) that he/she is holding in the real-world. In this example, the stick can be overlaid with a skin, such as a virtual baseball bat skin. Also, when the baseball is thrown toward the user in the real-world, the disclosed technology can display the baseball (or a representation thereof), as well as the stick overlaid with the virtual baseball bat skin, in combination with the virtual baseball stadium environment.

In another example, there can be a target object in the form of a stick. A virtual environment provided by the virtual environment module 340 of the VR system 300 can present a flight simulation environment. The disclosed technology can identify the stick from received image data. In this example, the disclosed technology can also provide a representation of the stick via a rendered joystick skin. The target object representation including the rendered joystick skin can be presented, by the combination module 350, in combination with the flight simulation environment. When the user moves the real-world stick, the disclosed technology can cause the representation (e.g., the rendered joystick) to correspondingly move in the flight simulation environment in (or near) real-time.

In a further example, there can be a target object in the form of a stick. A virtual environment provided by the virtual environment module 340 of the VR system 300 can present a space adventure environment. The disclosed technology can identify the stick from received image data. In this example, the disclosed technology can also provide a representation of the stick via a rendered space weapon skin (e.g., a light/optic/laser saber). The target object representation including the space weapon skin can be presented, by the combination module 350, in combination with the space adventure environment. When the user moves the real-world stick, the disclosed technology can cause the representation (e.g., the space weapon) to correspondingly move in the space adventure environment in (or near) real-time. Many variations are possible. For instance, in some cases, graphical overlays (e.g., skins) need not be utilized at all.

Additionally, the captured scene store 370 can be configured to facilitate storing data associated with a captured scene that includes a target object(s). For instance, the captured scene store 370 can store image data (e.g., one or more still image frames and/or video image frames) representing or depicting a real-world scene that includes the target object(s). The captured scene store 370 can also be configured to facilitate providing data associated with a captured scene to the identification module 320 for recognizing, detecting, tracking, and/or otherwise identifying the target object.

Moreover, the virtual environment store 380 can be configured to facilitate storing data associated with a virtual environment, as well as data associated with a combined scene that includes the rendered representation of a target object and virtual content from the virtual environment. The virtual environment store 380 can also be configured to facilitate providing data associated with the virtual environment and/or data associated with the combined scene to a HMD 150 for presentation to a user wearing the HMD 150.

Figure 4A:
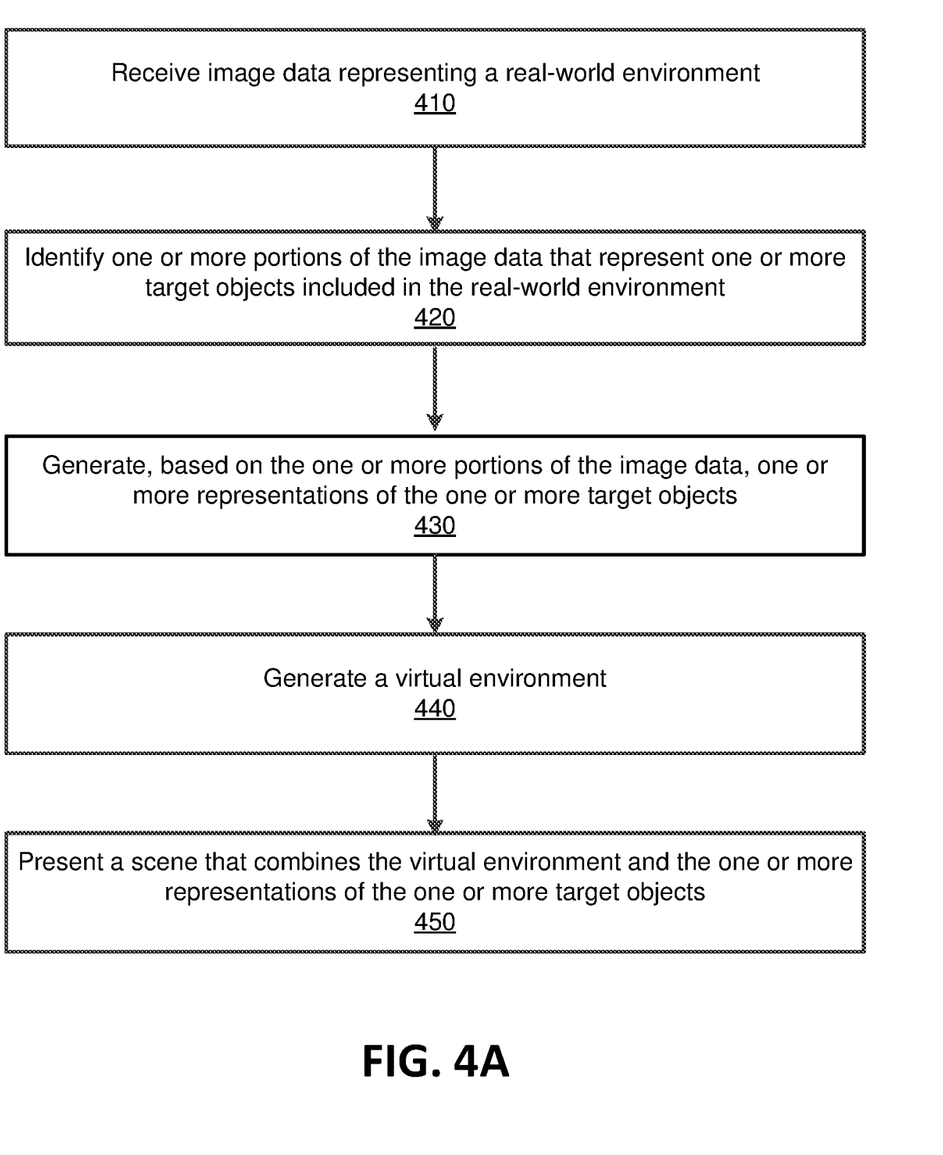
FIG. 4A illustrates a flowchart describing an example process of representing a real-world object with a virtual environment, in accordance with an embodiment.

FIG. 4A illustrates a flowchart describing an example process of representing a real-world object with a virtual environment, in accordance with an embodiment. In the example process, at block 410, image data representing a real-world environment can be received, such as via the image data module 310 and/or the input component 120. At block 420, one or more portions of the image data that represent one or more target objects included in the real-world environment can be identified, such as by the identification module 320. In some instances, the one or more portions of the image data can be associated with first pixel data (i.e., data associated with a first set of pixels forming the one or more portions). At block 430, one or more representations of the one or more target objects can be generated, such as by the representation module 330, based on the one or more portions of the image data. In some cases, the one or more representations of the one or more target objects can be associated with second pixel data (i.e., data associated with a second set of pixels forming the one or more representations). In such cases, the second pixel data can be generated by the representation module 330 based on the first pixel data. In one instance, the second set of pixels forming the one or more representations can be generated to be equivalent to the first set of pixels forming the identified one or more portions. In another instance, locational pixel data (e.g., pixel coordinates) for pixels in the first set can be utilized to determine locational pixel data (e.g., pixel coordinates) for pixels in the second set.

Continuing with the example of FIG. 4A, at block 440, a virtual environment can be generated, such as by the virtual environment module 340. At block 450, a scene that combines the virtual environment and the one or more representations of the one or more target objects can be presented, such as by the combination module 350. It should be appreciated that FIG. 4A shows merely one example, and in alternative embodiments, fewer, additional, and/or different steps may be included in the flowchart.

Figure 4B:
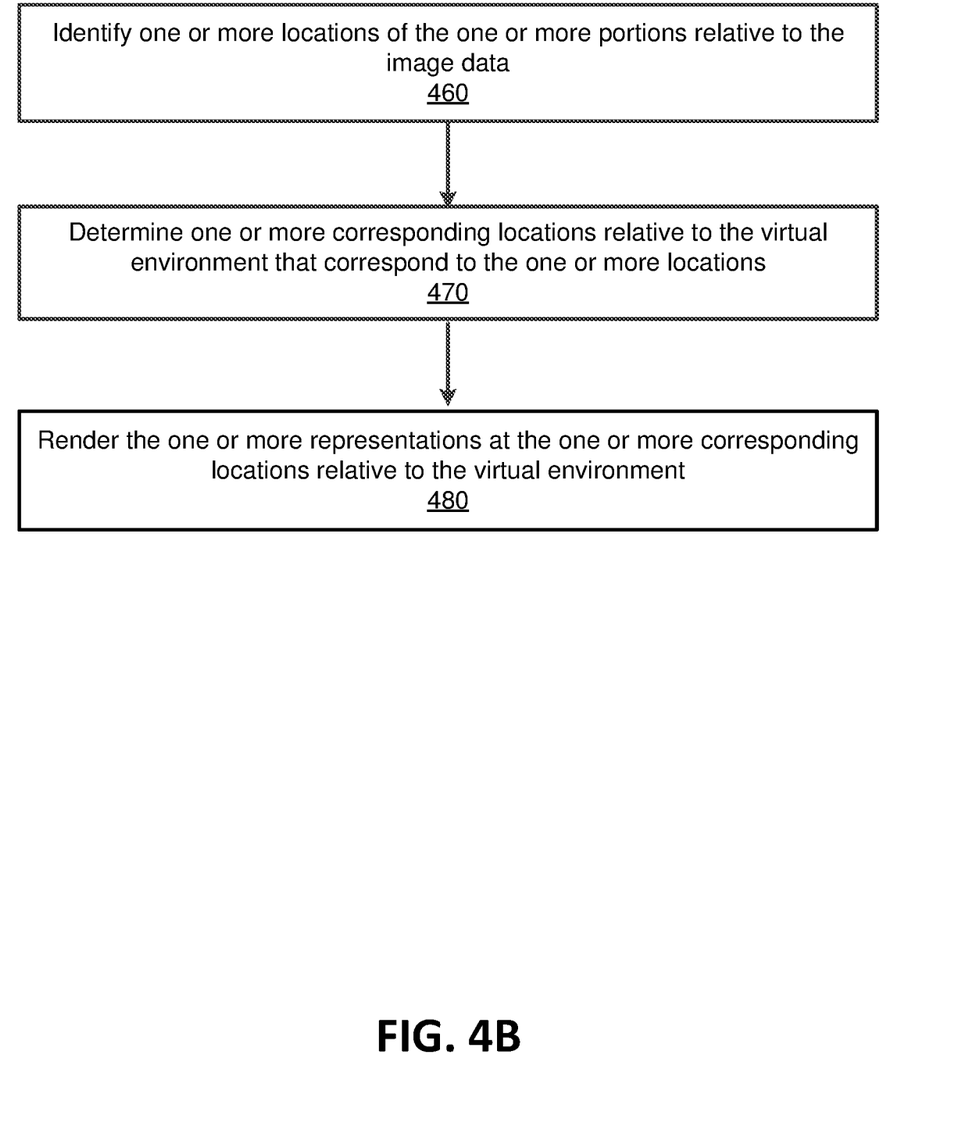
FIG. 4B illustrates a flowchart describing an example process of representing a real-world object with a virtual environment, in accordance with an embodiment.

FIG. 4B illustrates a flowchart describing an example process of representing a real-world object with a virtual environment, in accordance with an embodiment. In the example process of FIG. 4B, at block 460, one or more locations of the identified one or more portions relative to the image data can be identified, such as by the identification module 320. At block 470, one or more corresponding locations relative to the virtual environment that correspond to the one or more locations can be determined, such as by the virtual environment module 340. At block 480, the one or more representations can be rendered, such as by the representation module 330, at the one or more corresponding locations relative to the virtual environment. As discussed, it should be understood that there can be many variations associated with the disclosed technology.

Additional Configuration Information

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a virtual reality system, image data for an image frame of a real-world environment captured by an imaging sensor from a perspective of a head-mounted display worn by a wearer, the imaging sensor configured to capture a view of the real-world environment that the wearer would perceive if the wearer was not wearing the head-mounted display;
identifying, by the virtual reality system, a first set of pixels of the image data representing a target object in the received image frame, the target object included in the real-world environment and identified using object recognition by determining edges that contain the first set of pixels of the image data;
generating, by the virtual reality system, a scene of a virtual environment based on a set of virtual objects;
generating, by the virtual reality system, a combined scene that includes the scene of the virtual environment and the first set of pixels of the image data representing the target object without modification of the image data; and
presenting, by the virtual reality system, the combined scene on the head-mounted display.

2. The method of claim 1, wherein presenting the combined scene on the head mounted display comprises:
rendering the first set of pixels of the image data representing the target object at a set of coordinates and virtual content of the virtual environment rendered at all other locations of the scene.

3. The method of claim 1, wherein the first set of pixels of the image data representing the target object includes one or more graphical overlays.

4. The method of claim 1, wherein the target object is associated with at least one of a marker, a tag, a coloring, or a painting, and wherein the first set of pixels of the image data representing the target object is based on the at least one of the marker, the tag, the coloring, or the painting.

5. The method of claim 4, wherein the target object is associated with a marker that emits a wireless signal, wherein the first set of pixels of the image data representing the target object includes a graphical overlay selected based on the wireless signal.

6. A system comprising:
at least one processor; and
a memory storing instructions that, when executed by the at least one processor, cause the system to perform:
receiving image data for an image frame of a real-world environment captured by an imaging sensor from a perspective of a head-mounted display worn by a wearer, the imaging sensor configured to capture a view of the real-world environment that the wearer would perceive if the wearer was not wearing the head-mounted display;
identifying a first set of pixels of the image data representing a target object in the received image frame, the target object included in the real-world environment and identified using object recognition by determining edges that contain the first set of pixels of the image data;
generating a scene of a virtual environment based on a set of virtual objects;
generating a combined scene that includes the scene of the virtual environment and the first set of pixels of the image data representing the target object without modification of the image data; and
presenting the combined scene on the head-mounted display.

7. The system of claim 6, wherein presenting the combined scene on the head mounted display comprises:
rendering the first set of pixels of the image data representing the target object at a set of coordinates and virtual content of the virtual environment rendered at all other locations of the scene.

8. A non-transitory computer-readable storage medium including instructions that, when executed by at least one processor of a computing system, cause the computing system to perform a method comprising:

receiving image data for an image frame of a real-world environment captured by an imaging sensor from a perspective of a head-mounted display worn by a wearer, the imaging sensor configured to capture a view of the real-world environment that the wearer would perceive if the wearer was not wearing the head-mounted display;

identifying a first set of pixels of the image data representing a target object in the received image frame, the target object included in the real-world environment and identified using object recognition by determining edges that contain the first set of pixels of the image data;

generating a scene of a virtual environment based on a set of virtual objects;

generating a combined scene that includes the scene of the virtual environment and the first set of pixels of the image data representing the target object without modification of the image data; and presenting the combined scene on the head-mounted display.

9. The non-transitory computer-readable storage medium of claim 8, wherein presenting the combined scene on the head mounted display comprises:

rendering the first set of pixels of the image data representing the target object at a set of coordinates and virtual content of the virtual environment rendered at all other locations of the scene.

* * * * *